May 19, 1936.   W. R. QUAGLIOTTI   2,041,021
FOLDING BOX
Filed Nov. 7, 1933    7 Sheets-Sheet 1

Inventor:
William R. Quagliotti
By Cushman Darby & Cushman
Attorneys.

May 19, 1936. W. R. QUAGLIOTTI 2,041,021
FOLDING BOX
Filed Nov. 7, 1933 7 Sheets-Sheet 2

Inventor
William R. Quagliotti,
Attorneys

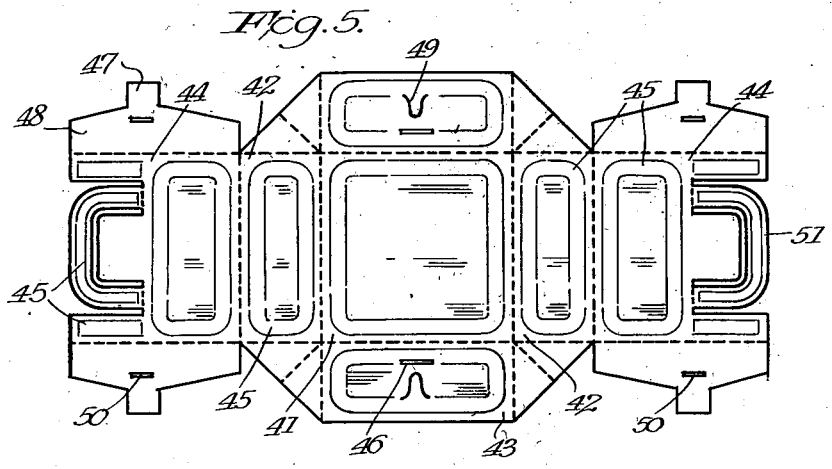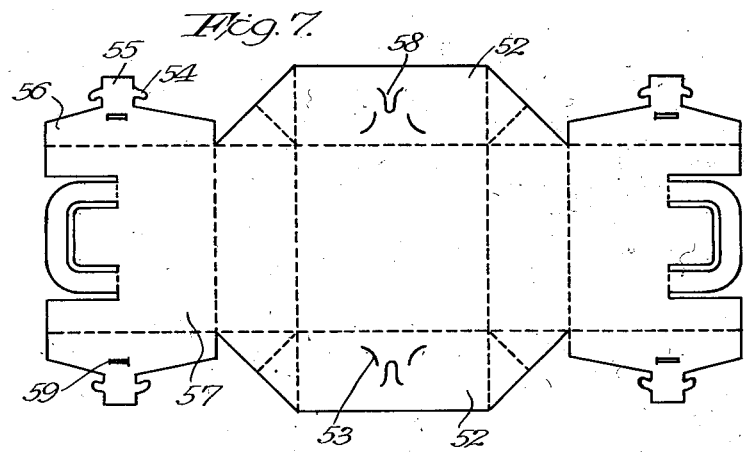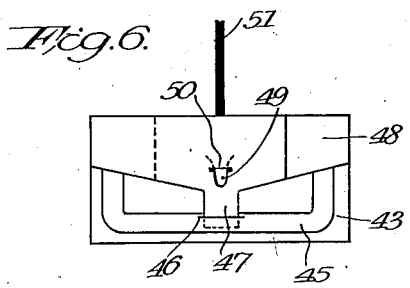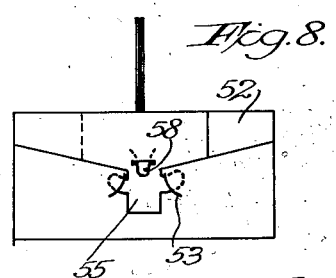

Inventor
William R. Quagliotti

May 19, 1936.　　W. R. QUAGLIOTTI　　2,041,021
FOLDING BOX
Filed Nov. 7, 1933　　7 Sheets-Sheet 5
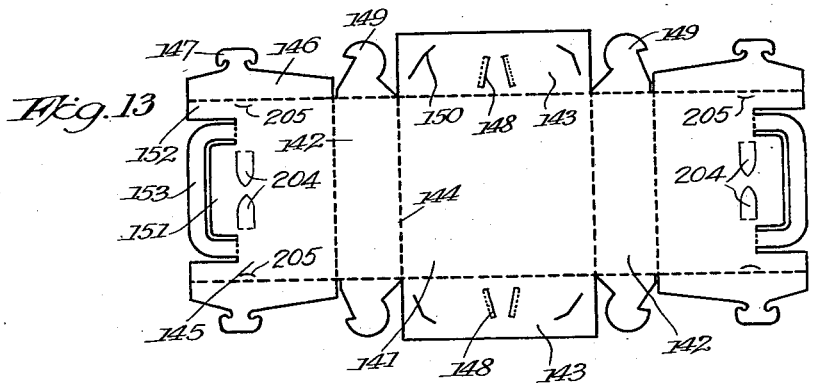
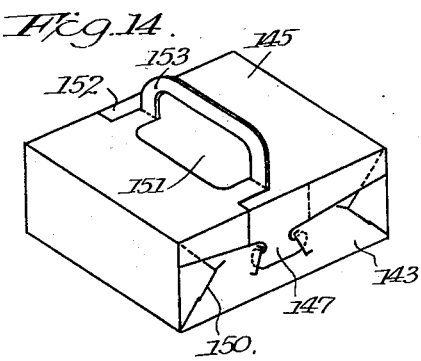
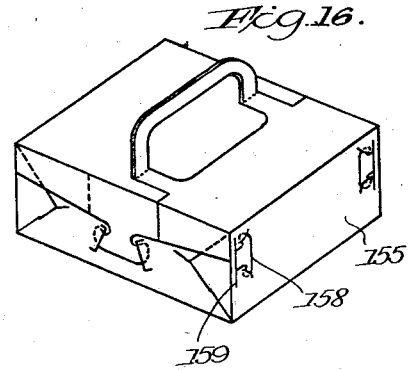
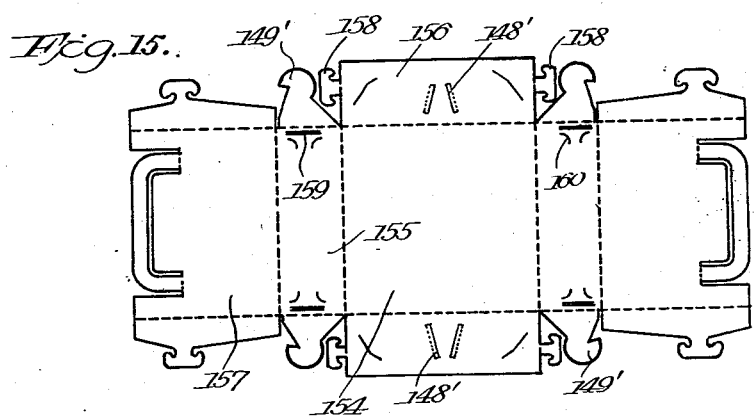
Inventor
William R. Quagliotti
By Cushman Darby & Cushman
Attorneys

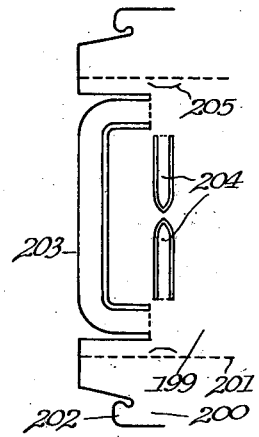 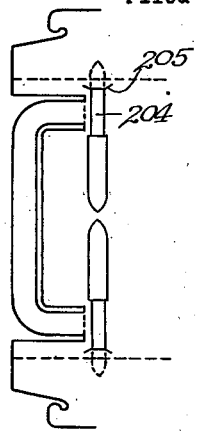 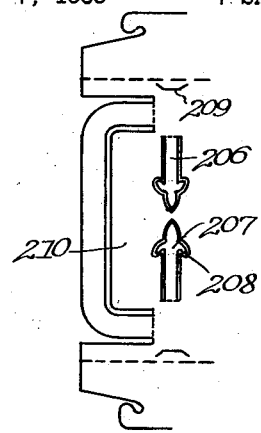 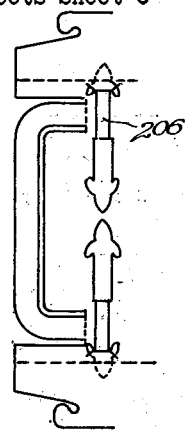
Fig. 17.  Fig. 18.  Fig. 19.  Fig. 20.
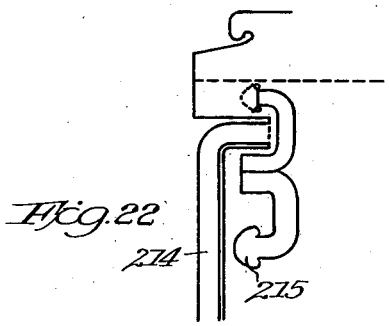 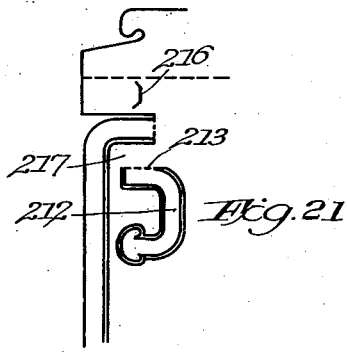
Fig. 22.  Fig. 21.

May 19, 1936.　　　W. R. QUAGLIOTTI　　　2,041,021
FOLDING BOX
Filed Nov. 7, 1933　　　7 Sheets-Sheet 7

Inventor
William R. Quagliotti

Patented May 19, 1936

2,041,021

UNITED STATES PATENT OFFICE 2,041,021

FOLDING BOX

William Romano Quagliotti, Victoria, British Columbia, Canada

Application November 7, 1933, Serial No. 697,052
In Canada August 9, 1933

12 Claims. (Cl. 229—52)

The present invention relates to foldable containers and more particularly, to an improved box or receptacle that may be formed from a blank at a minimum expenditure of time and labor.

An important feature of the invention is to provide a strong and durable box that is formed from a blank and which is so constructed as to be capable of withstanding the exacting usage to which articles of this kind are subjected.

A further object consists in providing novel means for maintaining the bottom, sides and top of a knockdown box in proper position when the box is assembled.

Other objects and advantages of the invention will become apparent from the following description when taken in conjunction with the accompanying claims and drawings.

Referring to the drawings in which are shown several embodiments the invention may assume:

Figure 5 is a plan view of a modification showing the bottom, sides and top provided with reinforcing means;

Figure 6 is an end view of the assembled box shown in Figure 5;

Figure 7 is a plan view of another modification;

Figure 8 is an assembled view of the box shown in Figure 7;

Figure 13 is a plan view of another modification;

Figure 14 is a perspective view of the assembled box shown in Figure 13;

Figure 15 is a plan view of another modification;

Figure 16 is a perspective view of the assembled box shown in Figure 15;

Figures 17 to 22 inclusive, are detailed views of the top of the box showing reinforcing means which may be associated therewith.

Figure 23:
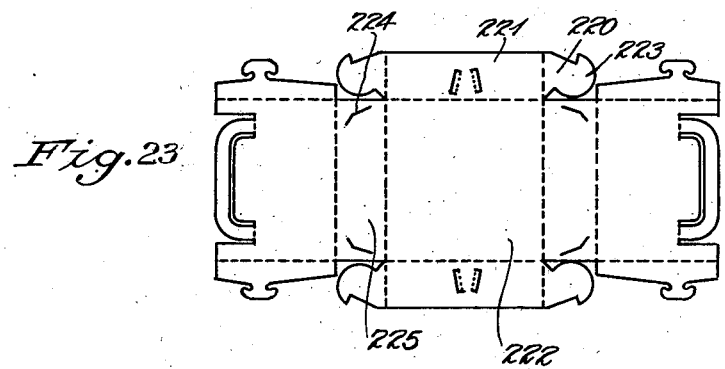
Figure 24:
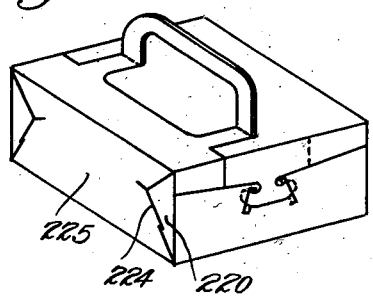
Figure 26:
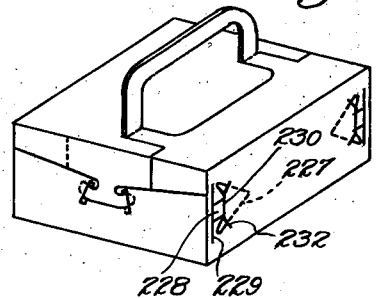
Figure 25:
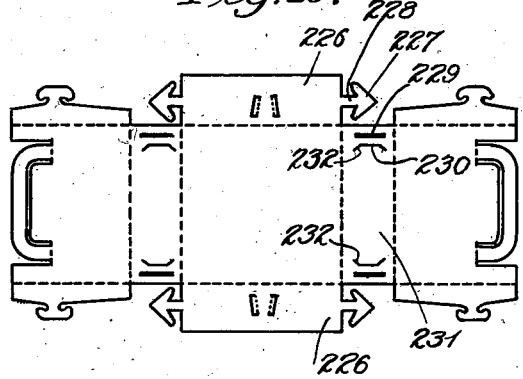

Figure 23 is a plan view of a blank showing another modification;

Figure 24 is a perspective view of the assembled blank shown in Figure 23;

Figure 25 is a plan view of another modification;

Figure 26 is a perspective view of a box formed from the blank shown in Figure 25.

Figure 2:
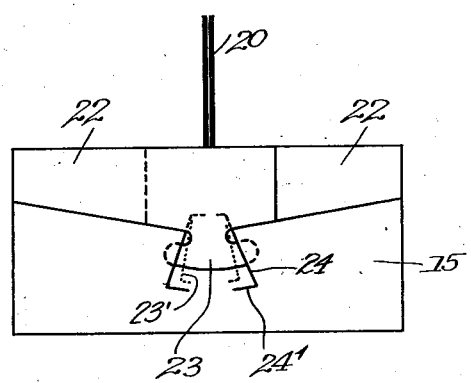
Figure 2 is an end view of the assembled box shown in Figure 1.

Referring to the drawings in which like numerals indicate like parts in the several views, 10 designates a blank of any suitable material, such as cardboard or the like, which may be provided with an intermediate portion 11 that constitutes the bottom of the box and has opposed pairs of projections 12, 13, 14 and 15 which, when folded along the score lines 16, constitute the sides of the box, the adjacent sides being connected by the corner portions 17. The opposed pair of projections 12 and 14 having extending therefrom, the similarly formed portions 18 and 19 that constitute the top of the box and are provided with medially disposed looped handles 20 arranged to be bent along the score lines 21 so as to extend upwardly from the top in adjacent relation, to assume the position shown in Figure 2. The top sections 18 and 19 are also provided with the marginal flaps 22 having tabs 23 which, when the box is assembled, are bent downwardly over the top so that the interlocking portions of the tabs will fit within adjacent pairs of slots 24 formed in the sides 13 and 14 respectively; each pair of slots 24 has spaced inclined openings terminating in inwardly extending end portion 24'. The sides 13 and 15 within the slots 24 may have the creasing or score lines 23' which constitute hinges for facilitating the introduction of the tabs into the slots 24. The opposed ends of the top sections 18 and 19, when the box is assembled are formed with intermediate flaps 25 which overlap so that one will extend through the openings in the handles 20 and the other will engage the under surface of the top flap. The top sections are also provided with end flaps 26 which extend in overlapping relation to each other beyond the base of the handles 20.

Figure 3:
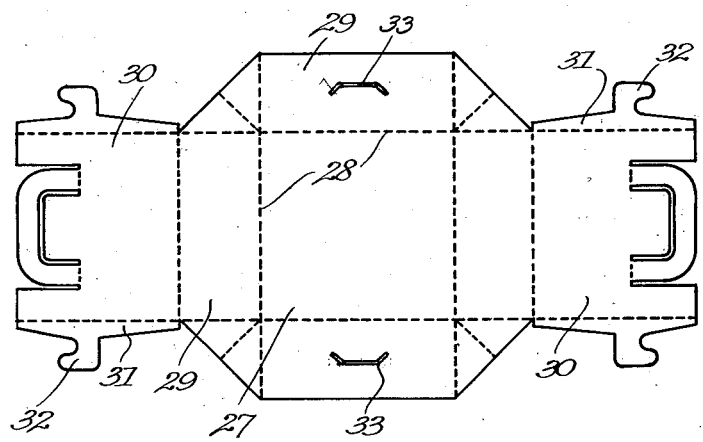
Figure 3 is a plan view of a modified form.

In the modification shown in Figure 3, the intermediate portion 27 of the blank is of substantially the same shape as previously described, and the blank is provided with the score lines 28 so as to form the sides 29 and the top sections 30 when the box is assembled. The flaps 31 formed on the top sections 30 are provided with the tabs 32, each adjacent pair of which overlap to fit within the openings 33 in opposed sides 29 when the box is set up.

Figure 1:
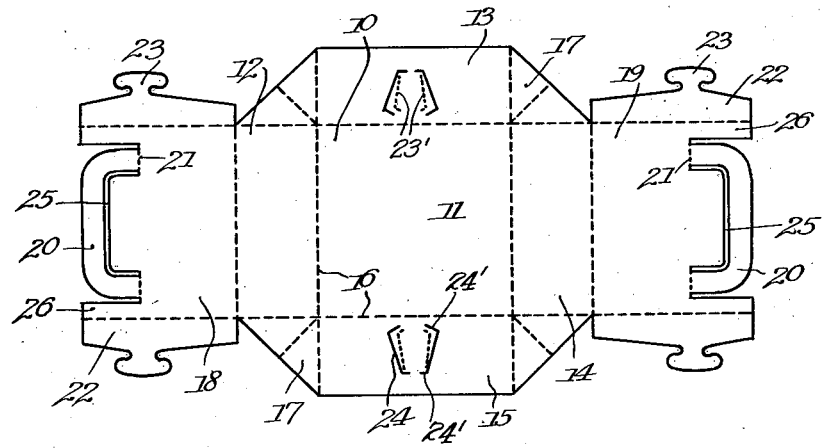
Figure 1 is a plan view of the blank prior to the box being assembled.
Figure 4:
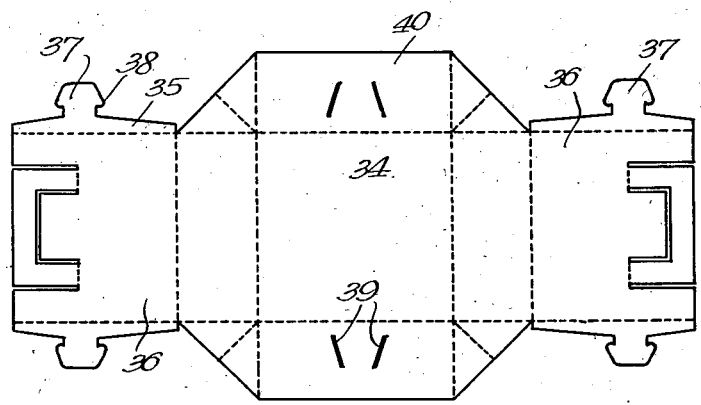
Figure 4 is a plan view of another modification.

In Figure 4, the box is formed from the blank 34 which is similar to the form shown in Figure 1 with the exception that the flaps 35 on the top sections 36 are provided with tabs 37 having shoulders 38 arranged when the tabs are inserted in the spaced openings 39 in the opposed sides 40, to provide an interlocking connection for maintaining the parts of the box in their assembled positions.

In the form of the invention illustrated in Figure 5, the bottom 41, the opposed pairs of sides 42 and 43, and top sections 44 are preferably embossed as at 45 so as to provide strengthening means for reinforcing the box. The opposed sides 43 have medially disposed slots 46 arranged to receive the tabs 47 on the flaps 48 that extend from the top sections 44 and are arranged to be bent downwardly over the sides so as to assume the position as shown in Figure 6. The sides 43 may have the tabs 49 which, when the box is assembled, are arranged to fit within the openings 50 in the flaps 48 to provide additional fastening devices for maintaining the parts in position. The handles, 51, which extend upwardly from the top sections 44 and their associated parts are substantially similar in construction to the handles previously described.

The form shown in Figure 7 is very much similar to the box shown in Figure 5 and essentially distinguishes therefrom in that the opposed sides 52 are each provided with spaced curved slits 53 arranged to receive the projections 54 on the tab 55 that extends from the flaps 56 of the top sections 57 when the box is assembled. Tabs 58 on the sides 52 are disposed to fit into the openings 59 in the flaps 56 so that the box, when set up, assumes the position shown in Figure 8.

Figure 10:
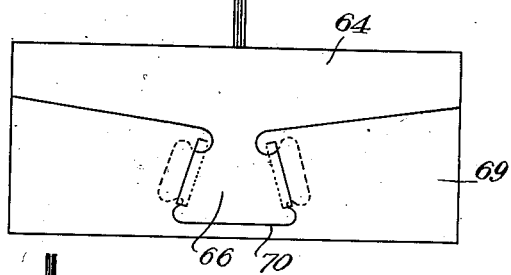
Figure 10 is an end view of the assembled box shown in Figure 9.
Figure 12:
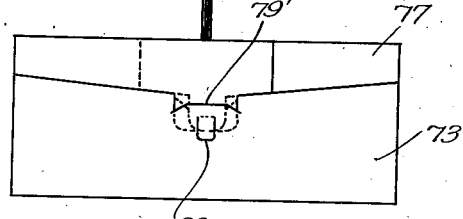
Figure 12 is an end view of the assembled box shown in Figure 11.
Figure 9:
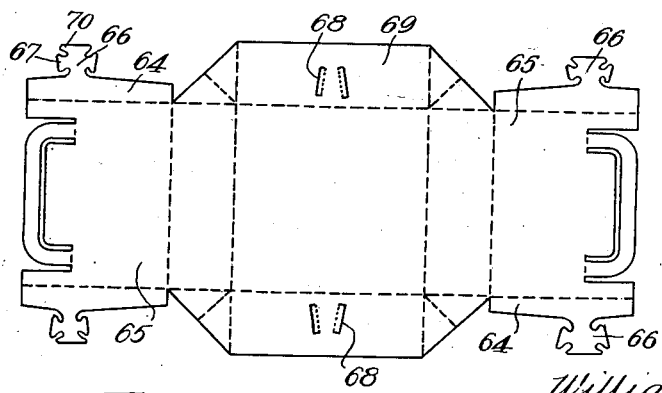
Figure 9 is a plan view of a blank showing another modification.

In the form shown in Figure 9, the means for connecting the flaps 64 of the top sections 65 preferably comprise the tabs 66 each of which has laterally extending arms 67 arranged to be inserted in the slits 68 in the opposed sides 69. Each tab also has an end portion 70 arranged to overlap the adjacent side 69 so that the tabs, when the box is assembled, assume the position as shown in Figure 10.

Figure 11:
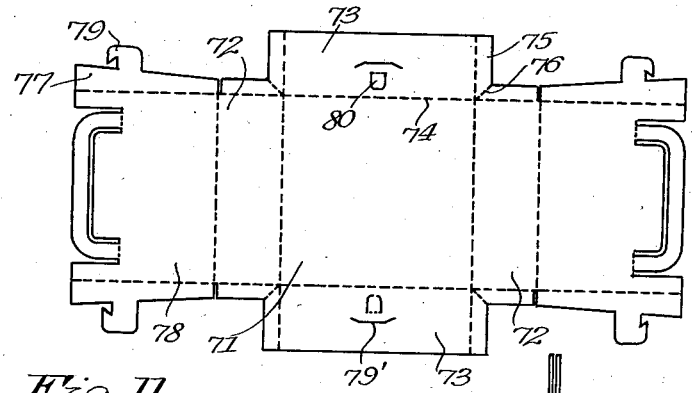
Figure 11 is a plan view of a modification.

In the blank shown in Figure 11, the bottom 71 has the opposed pair of extensions 72 and 73 respectively, which are arranged to be folded along the score lines 74 to constitute the sides of the box. The adjacent corners of the sides are preferably formed by the cut-away flanges or flaps 75 arranged to be folded along the diagonal score lines 76 so as to assume positions parallel to the adjacent sides of the box and reinforce the corners when the box is assembled. Either this form of corner construction or others, such as that shown in the previous forms may be employed in making the various modifications disclosed. The sides 73 are connected to the flaps 77 of the top sections 78 by the hook-shaped tabs 79 which fit within the slots 79'. In order to facilitate the introduction of the tabs into the slots 79', the side 73 adjacent the slots, may have a hand engaging portion or flap 80 so as to separate the walls of the slots 79' to permit the easy insertion or removal of the tabs 79. Manifestly other forms of the invention may be provided with similar means for opening the slots that receive the locking members.

A box formed by a blank shown in Figure 13 has a bottom 141 provided with the opposed pairs of projections 142 and 143 respectively which, when folded along the score lines 144, constitute the sides of the box. The projections 142 terminate in the top sections 145 which are similarly formed and have the flaps 146 which are provided with the tabs 147 arranged to fit within the slots 148 in the sides 143. Additionally, the projections 142 have interlocking tongues 149 which are received in the slits 150 in the side 143. Each of the top sections 145 has an intermediate flap 151 and end flaps 152 arranged to overlap and assume the position shown in Figure 14 when the box is assembled. It will be seen that by reason of the interlocking connection of the sides 142 and 143 by the tongues 149 engaging with the slits 150, that the top sections 145 may assume an open position when the sides are assembled.

In the form of the invention shown in Figure 15 the bottom 154 as well as the opposed pair of sides 155 and 156 and the top sections 157 may be substantially the same as the corresponding parts just previously described. The sides 156, however, are provided with laterally extending locking tongues 158 which pass through the openings 159 in the sides 155 so as to interlock with the slits 160 in the manner as clearly shown in Figure 16, and thus coact with the tabs 149' and slots 148' to provide a secure connection of the sides 155 and 156 and permit the top sections 157 to be opened when the sides are set up.

Figures 17 and 18 show one of the top sections 199 which may be similar in form to any of the corresponding parts previously described, and has the side flaps 200 arranged to be bent downwardly along the score lines 201 so that these flaps will overlap the sides, and the tabs 202 be received in a complementary slot in one of the sides in the manner as previously set forth. In order to reinforce the handle 203, each of the top sections may have cut-out portions 204 of sufficient length that when these portions are bent back upon the top section, they will extend across the base of the handle 203 which, in the meantime, has been bent upwardly so as to reinforce the handle at its point of connection with the top. A slot 205 is formed in the top section so as to receive the free end of the cut-out portion 204 for maintaining the latter across the base of the handle in the manner as shown in Figure 18. As shown in Figure 13, the base of each of the handles 153 is reinforced by the cut-out portions 204 which are arranged to be bent so as to fit into the slits 205 in substantially the same manner as shown in Figure 18.

Figures 19 and 20 show another modification of reinforcing means and differs from the form just described, in that the cut-out portions 206 have their free ends terminating in tabs 207, which are provided with curved hooked arms 208, each arranged to extend within the slit 209 in the top section 210.

In Figures 21 and 22, a curved cut-out portion 212 is provided which is arranged to be bent along the score line 213 so as to extend across the base of the handle 214. The cut-out portion 212 has a locking head 215 which fits within a slot 216 in the top section 217.

Figure 23 shows a modification somewhat similar to the form disclosed in Figure 13, but essentially distinguishes therefrom, in that the tabs 220 on the projections 221 of the base 222, terminate in laterally disposed hooks 223 arranged to fit into the complementary slots 224 in the other pair of projections 225, so that when the box is assembled it assumes the position shown in Figure 24. In all other respects the box is the same in construction as that shown in Figure 13.

Figure 25 shows a modification which differs from Figure 23, in that the opposed pair of projections 226 have substantially arrow-shaped locking tabs 227 extending lengthwise therefrom, so that when the box is assembled, the reduced portions 228 of the tabs are arranged to extend through a slot 229 and be bent so that the head of the tab may fit within a slit 230 formed in the other pair of projections 231 in the manner as shown in Figure 26. In order to insure a firm interlocking engagement of the tabs 227 with the slits 230, the latter have their ends 232 bent away from the slot 229. Otherwise this form of box is substantially the same in construction as that shown in Figure 23.

It will be manifest from the number of modifications, illustrating the invention, that various forms of locking means may be employed for connecting the parts together and that the handle portion may assume different shapes and be detachably connected to the sides of the box by various other means than those shown without departing from the spirit of the invention and the scope of the appended claims.

Moreover, the corner sections between the sides may be either triangular, as shown in certain of the forms, or may be partly or wholly cut-away.

I claim:—

1. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having at each end laterally disposed flaps arranged to overlap the adjacent side of the box and provided with tongues adapted to fit into complementary slots in the adjacent sides, one pair of said projections having outwardly extending tongues adapted to fit within complementary openings in the other projections when the box is assembled, whereby to retain the sides in their assembled position and permit the top to be opened.

2. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having at each end, laterally disposed flaps arranged when folded downwardly, to overlap the adjacent sides of the box, said flaps having medially disposed tabs, and the other of said projections having spaced inclined slots terminating in inwardly extending end portions for receiving said tabs when the box is assembled.

3. A foldable box formed from a blank and having an intermediate portion constituting the bottom opposed pairs of projections extending from the bottom, said projections, when folded, forming the sides of the box, one pair of the opposed projections having extensions which when folded, constitute the top of the box, said extensions terminating in medially disposed looped handle portions arranged to extend upwardly from the top in adjacent relation, said extensions having laterally disposed flaps arranged when folded downwardly to overlap the adjacent sides of the box, said top adjacent the base of the handles being provided with cut-out portions arranged when bent back upon the top to constitute reinforcing means for the handle, and means for maintaining the cut-out portions in position.

4. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having at each end laterally disposed flaps provided with interlocking tabs, one pair of said projections having laterally extending hooked tongues and spaced intermediate inclined slots, the other pair of said projections having slits adjacent their ends, said tongues when the box is assembled arranged to fit in said slits while said tabs are arranged to fit in said slots.

5. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having at each end laterally disposed flaps provided with interlocking tabs, one pair of said projections having laterally disposed arrow-shaped locking members provided with reduced stems and spaced intermediate inclined slots, the other pair of said projections having pairs of spaced slits adjacent their ends, said members when the box is assembled arranged to extend through one of the slits and be bent to engage with the other of each pair while the tabs fit into said slots.

6. A foldable box formed from a blank and having an intermediate portion constituting the bottom, opposed pairs of projections extending from the bottom, said projections when folded forming the sides of the box, one pair of the opposed projections having extensions which when folded, constitute the top of the box, said extensions having laterally disposed flaps of substantially the same uniform size and shape and arranged when folded downwardly to overlap the upper edge portion of the adjacent side of the box, and said flaps having registering tabs arranged to fit into complementary slots in the adjacent sides for maintaining the parts of the box in their assembled positions.

7. A foldable box formed from a blank and having an intermediate portion constituting the bottom, opposed pairs of projections extending from the bottom, said projections when folded forming the sides of the box, one pair of the opposed projections having extensions which when folded, constitute the top of the box, said extensions having laterally disposed flaps of substantially the same uniform size and shape and arranged when folded downwardly to overlap completely the upper edge portion of the adjacent side of the box, said flaps having tabs arranged to register in pairs along the adjacent sides of the box, and said adjacent sides having slots for receiving the registering pairs of tabs to maintain the parts of the box in their assembled positions.

8. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having laterally disposed flaps of substantially the same uniform size and shape and arranged when folded downwardly to overlap the upper edge portion of the adjacent side of the box, and said flaps having registering tabs arranged to fit into complementary slots in the adjacent sides for maintaining the parts of the box in their assembled positions.

9. A foldable box formed from a blank and having an intermediate portion constituting the bottom, opposed pairs of projections extending from the bottom, said projections when folded forming the sides of the box, one pair of the opposed projections having extensions which when folded, constitute the top of the box, said extensions terminating in medially disposed looped handle portions arranged to extend upwardly from the top in adjacent relation, said top adjacent the base of the handle being provided with cut-out portions arranged when bent back upon the top to constitute reinforcing means for the handles, said extensions having laterally disposed flaps of substantially the same uniform size and shape and arranged when folded downwardly to overlap the upper edge portion of the adjacent side of the box, and said flaps having registering tabs arranged to fit into complementary slots in the adjacent sides for maintaining the parts of the box in their assembled positions.

10. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having laterally disposed flaps of substantially the same uniform size and shape and arranged when folded downwardly to overlap the upper edge portion of the adjacent side of the box, said flaps having tabs arranged to register in pairs along the adjacent sides of the box, and said adjacent sides having spaced inclined slots terminating in inwardly extending end portions for receiving said tabs when the box is assembled, the portions of said adjacent sides confined between said inclined slots being scored to provide hinges for facilitating the introduction of the tabs into said slots.

11. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions arranged to extend upwardly from the top in adjacent relation, said extensions having laterally disposed flaps of substantially the same uniform size and shape and arranged when folded downwardly to overlap the upper edge portion of the adjacent side of the box, said extensions terminating in tabs arranged to register in pairs along the adjacent sides of the box, said adjacent sides having medially disposed slots for receiving the registering pairs of tabs, and one pair of said projections having outwardly extending tongues arranged to fit within complementary openings in the adjacent sides when the box is assembled whereby to maintain the sides in their assembled positions.

12. A foldable box formed from a blank and having an intermediate portion constituting the bottom, opposed pairs of projections extending from the bottom, said projections when folded forming the sides of the box, one pair of the opposed projections having extensions which when folded constitute the top of the box, said extensions terminating in medially disposed looped handle portions, arranged to extend upwardly from the top in adjacent relation, said extensions having at each end laterally disposed flaps of substantially the same uniform size and shape and arranged when folded downwardly to overlap the adjacent side of the box, said extensions provided with tabs arranged to register in pairs along the adjacent sides of the box, said adjacent sides having medially disposed slots for receiving the registering pairs of tabs and one pair of said projections having laterally disposed arrow-shaped locking members provided with reduced stems, and the other of said projections having pairs of spaced slits adjacent their ends, said members when the box is assembled arranged to extend through one of the slits and arranged to engage with the other of each pair.

WILLIAM ROMANO QUAGLIOTTI.